United States Patent
Zhang et al.

(10) Patent No.: US 8,917,904 B2
(45) Date of Patent: Dec. 23, 2014

(54) VEHICLE CLEAR PATH DETECTION

(75) Inventors: Wende Zhang, Shelby Township, MI (US); Mark J. Wolski, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1323 days.

(21) Appl. No.: 12/108,581

(22) Filed: Apr. 24, 2008

(65) Prior Publication Data

US 2009/0268946 A1 Oct. 29, 2009

(51) Int. Cl.
*G06K 9/00* (2006.01)
*G06K 9/62* (2006.01)

(52) U.S. Cl.
CPC .................................. *G06K 9/00791* (2013.01)
USPC ............................ 382/103; 382/104; 382/224

(58) Field of Classification Search
USPC .......... 382/100, 104, 217–221, 228; 700/259; 701/223, 300–302
See application file for complete search history.

(56) References Cited

U.S. PATENT DOCUMENTS

| | | | |
|---|---|---|---|
| 5,172,315 A | 12/1992 | Asanuma et al. | |
| 6,728,608 B2 * | 4/2004 | Ollis et al. | 701/28 |
| 7,376,262 B2 | 5/2008 | Hu | |
| 7,440,585 B2 | 10/2008 | Roh | |
| 2001/0046309 A1 * | 11/2001 | Kamei | 382/103 |
| 2002/0110283 A1 * | 8/2002 | Fan et al. | 382/264 |
| 2002/0191838 A1 * | 12/2002 | Setterholm | 382/154 |
| 2004/0234136 A1 * | 11/2004 | Zhu et al. | 382/224 |
| 2006/0212222 A1 * | 9/2006 | Miyoshi et al. | 701/301 |
| 2006/0213714 A1 | 9/2006 | Igawa | |
| 2007/0183651 A1 * | 8/2007 | Comaniciu et al. | 382/154 |
| 2009/0268948 A1 | 10/2009 | Zhang et al. | |
| 2009/0295917 A1 | 12/2009 | Zhang et al. | |
| 2010/0013615 A1 * | 1/2010 | Hebert et al. | 340/425.5 |
| 2010/0017060 A1 | 1/2010 | Zhang et al. | |
| 2010/0097455 A1 | 4/2010 | Zhang et al. | |
| 2010/0097456 A1 | 4/2010 | Zhang et al. | |
| 2010/0097457 A1 | 4/2010 | Zhang et al. | |
| 2010/0097458 A1 | 4/2010 | Zhang et al. | |
| 2010/0098290 A1 | 4/2010 | Zhang et al. | |
| 2010/0098295 A1 | 4/2010 | Zhang et al. | |
| 2010/0098297 A1 | 4/2010 | Zhang | |
| 2010/0100268 A1 | 4/2010 | Zhang et al. | |
| 2010/0104137 A1 | 4/2010 | Zhang et al. | |
| 2010/0104199 A1 | 4/2010 | Zhang et al. | |
| 2010/0106356 A1 * | 4/2010 | Trepagnier et al. | 701/25 |
| 2010/0121577 A1 | 5/2010 | Zhang et al. | |

FOREIGN PATENT DOCUMENTS

| | | |
|---|---|---|
| DE | 19926559 A1 | 12/2000 |
| DE | 10059900 A1 | 6/2002 |
| DE | 69922973 T2 | 5/2005 |
| DE | 102004047130 A | 4/2006 |
| DE | 10 2006 060 893 A1 | 11/2007 |

(Continued)

OTHER PUBLICATIONS

U.S. Appl. No. 61/215,745.

(Continued)

*Primary Examiner* — Yubin Hung (57) ABSTRACT

A method for vehicle clear path detection using a camera includes imaging a ground area in front of the vehicle with the camera to produce a ground image and analyzing the ground image to formulate a clear path free of objects limiting travel of the vehicle.

13 Claims, 5 Drawing Sheets

(56) References Cited

FOREIGN PATENT DOCUMENTS

| | | |
|---|---|---|
| DE | 102006039832 A1 | 3/2008 |
| DE | 10 2006 046 843 A1 | 4/2008 |
| DE | 10 2006 061 390 A1 | 7/2008 |
| EP | 0488828 A2 | 6/1992 |
| JP | 2003189291 A | 7/2003 |
| KR | 102005006906 A | 7/2005 |
| KR | 102006002138 A | 3/2006 |
| WO | 2008 071 473 A1 | 6/2008 |

OTHER PUBLICATIONS

Lowe, David G., "Distinctive Image Features from Scale-Invariant Keypoints," International Journal of Computer Vision, Jan. 5, 2004.

Lucas, Bruce D., "An Iterative Image Registration Techique with an Application to Stereo Vision," Proceedings of Imaging Understanding Workshop, pp. 121-130 (1981).

Harris, Chris, "A Combined Corner and Edge Detector," 1988.

Mallat, S., A Theory for Multi-Resolution Signal Decomposition: The Wavelet Representation, IEEE Transactions on Pattern Analysis and Machine Intelligence, 11, 1989, pp. 674-693.

Haar, A., Zur Theorie der orthogonalen Funktionensysteme, Mathennatische Annalen, 69, 1910, pp. 331-371.

Daugman, J.G., Uncertainty Relations for Resolution in Space, Spatial frequency, and Orientation Optimized by Two-Dimensional Visual Cortical Filters, Journal of the Optical Society of America A, vol. 2, 1985, pp. 1160-1169.

Leung, T. and Malik, J., Representing and Recognizing the Visual Appearance of Materials Using Three Dimensional Textons, International Journal of Computer Vision, 43(1), Jun. 2001, pp. 29-44.

Burges, C. J.C., A Tutorial on Support Vector Machines for Pattern Recognition, 1998, pp. 1-43, Kluwer Academic Publishers, Boston.

\* cited by examiner

VEHICLE CLEAR PATH DETECTION

TECHNICAL FIELD

This disclosure is related to automated or semi-automated control of a motor vehicle.

BACKGROUND

The statements in this section merely provide background information related to the present disclosure and may not constitute prior art.

Autonomous driving systems and semi-autonomous driving systems utilize inputs regarding the road and other driving conditions to automatically control throttle and steering mechanisms. Accurate estimation and projection of a clear path over which to operate the vehicle is critical to successfully replacing the human mind as a control mechanism for vehicle operation.

Road conditions can be complex. Under normal operation of a vehicle, the human operator makes hundreds of observations per minute and adjusts operation of the vehicle on the basis of perceived road conditions. One aspect of perceiving road conditions is the perception of the road in the context of objects in and around the roadway and navigating a clear path through any objects. Replacing human perception with technology must include some means to accurately perceive objects and continue to effectively navigate around such objects.

Technological means for perceiving an object include data from visual cameras and radar imaging. Cameras translate visual images in the form of radiation such as light patterns or infrared signatures into a data format capable of being studied. One such data format includes pixelated images, in which a perceived scene is broken down into a series of pixels. Radar imaging utilizes radio waves generated by a transmitter to estimate shapes and objects present in front of the transmitter. Patterns in the waves reflecting off these shapes and objects can be analyzed and the locations of objects can be estimated.

Once data has been generated regarding the ground in front of the vehicle, the data must be analyzed to estimate the presence of objects from the data. Methods are known to study pixels in terms of comparing contrast between pixels, for instance identifying lines and shapes in the pixels and pattern recognition in which a processor may look for recognizable shapes in order to estimate an object represented by the shapes. By using cameras and radar imaging systems, ground or roadway in front of the vehicle can be searched for the presence of objects that might need to be avoided. However, the mere identification of potential objects to be avoided does not complete the analysis. An important component of any autonomous system includes how potential objects identified in perceived ground data are processed and manipulated to form a clear path in which to operate the vehicle.

One known method to form a clear path in which to operate the vehicle is to catalog and provisionally identify all perceived objects and form a clear path in light of the locations and behaviors of identified objects. Images may be processed to identify and classify objects according to their form and relationship to the roadway. While this method can be effective in forming a clear path, it requires a great deal of processing power, requiring the recognition and separation of different objects in the visual image, for instance, distinguishing between a tree along the side of the road and a pedestrian walking toward the curb. Such methods can be slow or ineffective to process complex situations or may require bulky and expensive equipment to supply the necessary processing capacity.

SUMMARY

A method for vehicle clear path detection using a camera includes imaging a ground area in front of the vehicle with the camera to produce a ground image and analyzing the ground image to formulate a clear path free of objects limiting travel of the vehicle including iteratively identifying a component patch of the ground image, extracting a feature from the component patch, and classifying the component patch based upon the feature.

BRIEF DESCRIPTION OF THE DRAWINGS

One or more embodiments will now be described, by way of example, with reference to the accompanying drawings, in which.

DETAILED DESCRIPTION

Figure 1:
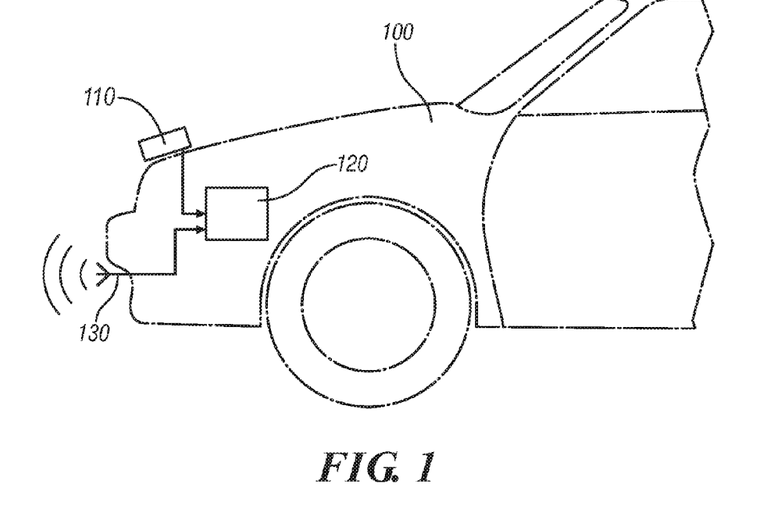
FIG. 1 illustrates an exemplary arrangement of a vehicle equipped with a camera and a radar imaging system in accordance with the disclosure.

Referring now to the drawings, wherein the showings are for the purpose of illustrating certain exemplary embodiments only and not for the purpose of limiting the same, FIG. 1 illustrates an exemplary arrangement of camera 110 located on the front of vehicle 100 and pointed toward the ground in front of vehicle 100 in accordance with the disclosure. Camera 110 is in communication with control module 120 containing logic to process inputs from camera 110. Vehicle 100 may also be equipped with a radar imaging system 130, which, when present, is also in communication with control module 120. It should be appreciated by those having ordinary skill in the art that vehicle 100 could utilize a number of methods to identify road conditions in addition or in the alternative to the use of camera 110 and radar imaging system, including GPS information, information from other vehicles in communication with vehicle 100, historical data concerning the particular roadway, biometric information such as systems reading the visual focus of the driver, or other similar systems. The particular arrangement and usage of devices utilized to analyze road data and augment the analysis of visual images is not intended to be limited to the exemplary embodiments described herein.

Figure 2:
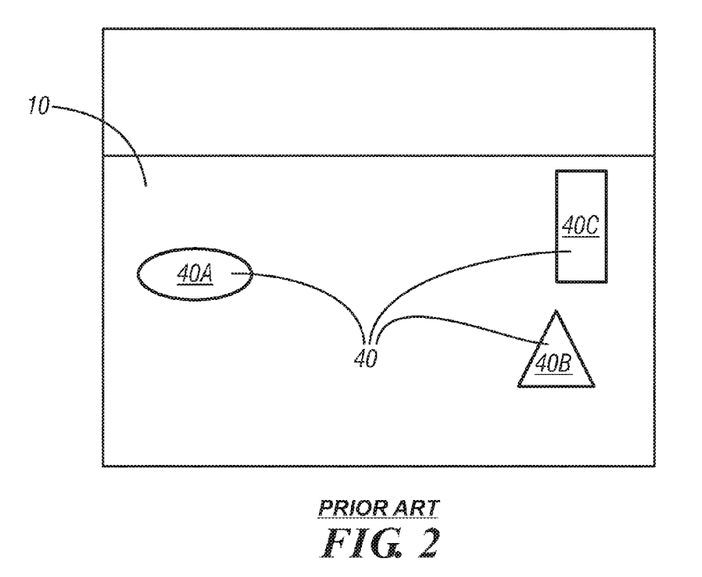
FIG. 2 illustrates a known method to determine a clear path for autonomous driving in accordance with the disclosure.

As aforementioned, FIG. 2 illustrates a known method to determine a clear path for autonomous driving in accordance with the disclosure. Image 10 is generated corresponding to the roadway in front of vehicle 100. Through one of various methods, objects 40A, 40B, and 40C are identified within image 10, and each object is categorized and classified according to filtering and trained object behaviors. Separate treatment of each object can be computationally intensive, and requires expensive and bulky equipment to handle the computational load. An algorithm processes all available information regarding the roadway and objects 40 to estimate a clear path available to vehicle 100. Determination of the clear path depends upon the particular classifications and behaviors of the identified objects 40.

Figures 3, 4:
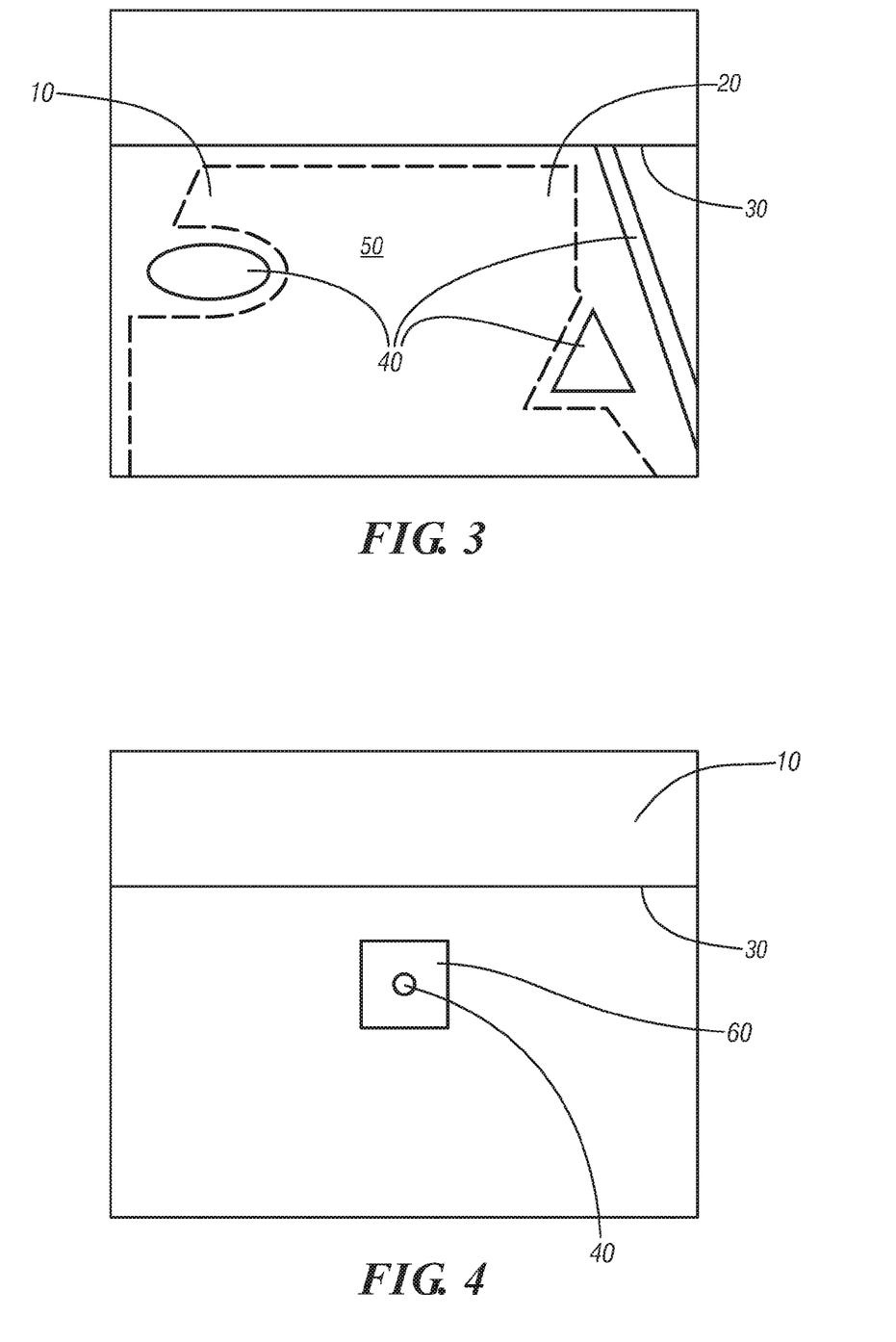
FIG. 3 illustrates an exemplary method to determine a clear path utilizing a likelihood analysis of an image in accordance with the disclosure.
FIG. 4 illustrates an exemplary method to analyze an image in accordance with the disclosure.

FIG. 3 illustrates an exemplary method to determine a clear path for autonomous or semi-autonomous driving in accordance with the disclosure. Image 10 is depicted including ground 20, horizon 30, and objects 40. Image 10 is collected by camera 110 and represents the road environment in front of vehicle 100. Ground 20 represents the zone of all available paths open to travel without any discrimination on the basis of objects that might be present. The method of FIG. 3 determines a clear path upon ground 20 starts by presuming all of ground 20 is clear, and then utilizes available data to disqualify portions of ground 20 as not clear. In contrast to the method of FIG. 2 which classifies every object 40, the method of FIG. 3 instead analyzes ground 20 and seeks to define a likelihood from available data that some detectable anomaly which may represent object 40 limits or makes not clear that portion of ground 20. This focus upon ground 20 instead of objects 40 avoids the complex computational tasks associated with managing the detection of the objects. Individual classification and tracking of individual objects is unnecessary, as individual objects 40 are simply grouped together as a part of the overall uniform limitation upon ground 20. Ground 20, described above as all paths open to travel without discrimination, minus limits placed on ground 20 by areas found to be not clear, define clear path 50, depicted in FIG. 3 as the area within the dotted lines, or an area with some threshold likelihood of being open for travel of vehicle 100.

Object 40 that creates not clear limitations upon ground 20 can take many forms. For example, an object 40 can represent a discreet object such as a parked car, a pedestrian, or a road obstacle, or object 40 can also represent a less discreet change to surface patterns indicating an edge to a road, such as a road-side curb, a grass line, or water covering the roadway. Object 40 can also include an absence of flat road associated with ground 20, for instance, as might be detected with a large hole in the road. Object 40 can also include an indicator without any definable change in height from the road, but with distinct clear path implications for that segment of road, such as a paint pattern on the roadway indicative of a lane marker. The method disclosed herein, by not seeking to identify object 40 but merely to take visual cues from ground 20 and anything in proximity to the ground in image 10, evaluates a likelihood of clear versus not clear and adjusts the control of vehicle 100 for the presence of any object 40.

The control module 120 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. Control module 120 has a set of control algorithms, comprising resident program instructions and calibrations stored in the non-volatile memory and executed to provide the respective functions of the control module. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing vehicle operation. Alternatively, algorithms may be executed in response to occurrence of an event.

The control module 120 executes algorithmic code stored therein to monitor related equipment such as camera 110 and radar imaging system 130 and execute commands or data transfers as indicated by analysis performed within the control module. Control module 120 may include algorithms and mechanisms to actuate autonomous driving control by means known in the art and not described herein, or control module 120 may simply provide information to a separate autonomous driving system. Control module 120 is adapted to receive input signals from other systems and the operator as necessary depending upon the exact embodiment utilized in conjunction with the control module.

Camera 110 is a device well known in the art capable of translating visual inputs in the form of light, infrared, or other electromagnetic (EM) radiation into a data format readily capable of analysis, such as a pixelated image. Radar imaging device 130 is a device well known in the art incorporating a transmitter capable of emitting radio waves or other EM radiation, a receiver device capable of sensing the emitted waves reflected back to the receiver from objects in front of the transmitter, and means to transfer the sensed waves into a data format capable of analysis, indicating for example range and angle from the objects off which the waves reflected.

Numerous methods for automated analysis of two-dimensional (2D) images are possible. Analysis of image 10 is performed by an algorithm within control module 120. FIG. 4 illustrates one exemplary method which may be applied to analyze image 10 in accordance with the disclosure. This method subdivides image 10 and identifies a sub-image or patch 60 of ground 20 for analysis, extracts features or analyzes the available visual information from patch 60 to identify any interesting or distinguishing features within the patch, and classifies the patch according to a likelihood of being a clear path according to analysis of the features. Patches with greater than a certain threshold of likeliness are classified as clear, and a compilation of patches can be used to assemble a clear path within the image.

Patch 60, as a sub-image of image 10, can be identified through any known means, such as random search or swarm search of image 10. Alternatively, information regarding the presence of an object 40 available from some other source of information, such as radar imaging system 130, can be used to identify a patch to analyze the portion of image 10 which should describe object 40. Image 10 may require many patches 60 to analyze the whole image. In addition, multiple overlaying patches or patches of different size could be used to fully analyze a region of image 10 containing information of interest. For instance, a small patch 60 might be used to analyze a small dot on the road; however, a large patch 60 might be required to analyze a series of dots which in isolation might seem uninteresting, but in context of the entire series, could indicate an object 40 of interest. In addition, the resolution of patches applied to a particular area may be modulated based upon information available, for instance, with more patches being applied to a region of image 10 wherein an object 40 is thought to exist. Many schemes or strategies can be utilized to define patches 60 for analysis, and the disclosure is not intended to be limited to the specific embodiments described herein.

Once a patch 60 has been identified for analysis, control module 120 processes the patch by application of a filter to extract features from the patch. Additionally, control module 120 may perform analysis of the location of the patch in context to the location of the vehicle. Filters utilized may take many forms. Filtering algorithms utilized to extract features often search the available visual information for characteristic patterns in the data, defining features by line orientation, line location, color, corner characteristics, other visual attributes, and learned attributes. Learned attributes may be learned by machine learning algorithms within the vehicle, but are most frequently programmed offline and may be developed experimentally, empirically, predictively, through modeling or other techniques adequate to accurately train distinguishing attributes.

Once features in patch 60 have been extracted, the patch is classified on the basis of the features to determine the likelihood that the patch is a clear path. Likelihood analysis is a process known in the art by which a likelihood value or a confidence is developed that a particular condition exists. Applied to the present disclosure, classification includes likelihood analysis to determine whether the patch represents a clear path or if ground 20 in this patch is limited by an object 40. Classification is performed in an exemplary embodiment by application of classifiers or algorithms trained with a database of exemplary road conditions and interactions with detected objects. These classifiers allow control module 120 to develop a fractional clear path likelihood value for patch 60, quantifying a confidence between zero and one that the features identified within the patch do not indicate a limiting object 40 which would inhibit free travel of vehicle 100. A threshold confidence can be set, defining the clear path likelihood required to define the patch as a clear path, for instance by the following logic:

$$\text{Confidence} = \text{ClearPathLikelihood}(i) \text{ If\_Confidence} > 0.5, \text{ then\_patch} = \text{clearpath} \quad (1)$$

In this particular exemplary embodiment, a confidence of 50% or 0.5 is selected as the threshold confidence. This number can be developed experimentally, empirically, predictively, through modeling or other techniques adequate to accurately evaluate patches for clear path characteristics.

Figure 5:
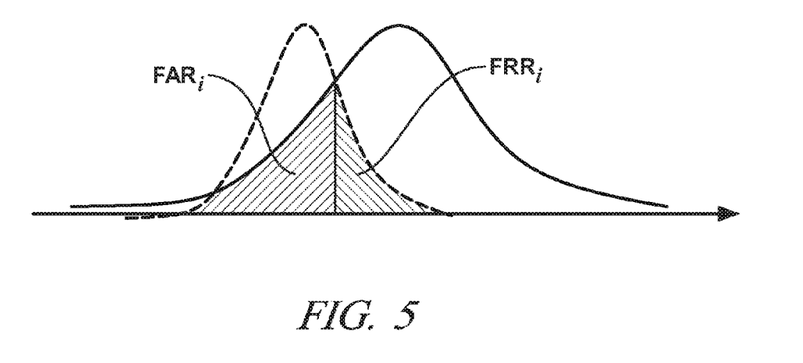
FIG. 5 illustrates an exemplary method to define a classification error by tuning a single threshold in accordance with the disclosure.

The likelihood analysis, as mentioned above, may be performed in one exemplary embodiment by application of trained classifiers to features extracted from a patch. One method analyzes the features a-priori using a training set of images. In this training stage, distinguishing features are selected from a raw feature set, the distinguishing features being defined by methods known in the art, such as Haar wavelet, Gabor wavelet, and Leung-and-Malik filter bank. In addition, 2D image location information based on each feature's minimal classification errors, calculated as the sum of false acceptance rate (FAR) and false rejection rate (FRR), may be utilized by tuning a single threshold as illustrated in FIG. 5. This classification error can be described through the following expression:

$$\text{ClassificationError}(i) = FAR_i + FRR_i \quad (2)$$

Information from the trained classifiers is used to classify or weight the feature as indicating a clear path or not clear path, the particular classification depending upon the strength of comparisons to the trained data. Classification of the feature, if the feature is the only feature within the patch, may be directly applied to the patch. Classification of a patch with multiple features identified may take many forms, including the patch being defined by the included feature most indicative of the patch being not clear or the patch being defined by a weighted sum of all of the features included therein.

The above method can be utilized to examine an individual image 10 and estimate a clear path 50 based upon visual information contained within image 10. This method may be repeated at some interval as the vehicle travels down the road to take new information into account and extend the formulated clear path to some range in front of the vehicle's new position. Selection of the interval must update image 10 with enough frequency to accurately supply vehicle 100 with a clear path in which to drive. However, the interval can also be selected to some minimum value to adequately control the vehicle but also not to unduly burden the computational load placed upon control module 120.

Clear path detection can be accomplished through a single image 10 as described above. However, processing speed and accuracy can be improved with the addition of a second image taken in close time proximity to the original image, such as sequential images from a streaming video clip. A second image allows direct comparison to the first and provides for updated information regarding progression of the vehicle and movement of detected objects. Also, the change of perspective of camera 110 allows for different analysis of features from the first image: a feature that may not have shown up clearly or was indistinct in the first image may display at a different camera angle, stand out more distinctly, or may have moved since the first image, allowing the classification algorithm an additional opportunity to define the feature.

Processing of a second image in relation to the original image 10 can be performed by calculating an image difference. If the image difference of a point of interest, such as a feature identified by radar, is not zero, then the point can be identified as embodying new information. Points where the image difference does equal zero can be eliminated from analysis and computation resources may be conserved. Methods to determine image difference include absolute image intensity difference and vehicle-motion compensated image difference.

Determining an image difference by calculating an absolute image intensity difference can be used to gather information between two images. One method of absolute image intensity difference includes determining equivalent image characteristics between the original image and the second image in order to compensate for movement in the vehicle between the images, overlaying the images, and noting any significant change in intensity between the images. A comparison between the images indicating a change in image intensity in a certain area contains new information. Areas or patches displaying no change in intensity can be de-emphasized in analysis, whereas areas displaying clear changes in intensity can be focused upon, utilizing aforementioned methods to analyze patches on either or both captured images.

Figure 6A:
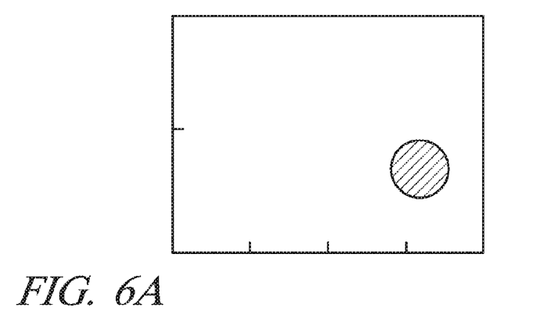
FIGS. 6A, 6B, and 6C illustrate an exemplary determination of an image difference by calculating an absolute image intensity difference in accordance with the disclosure.
Figure 6B:
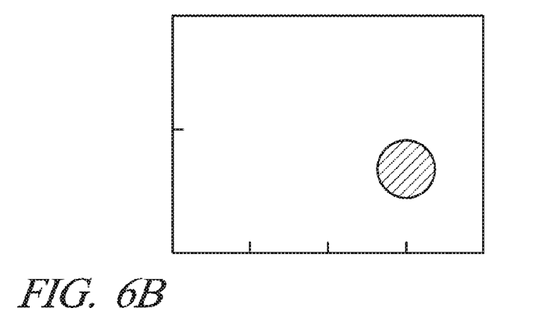
Figure 6C:
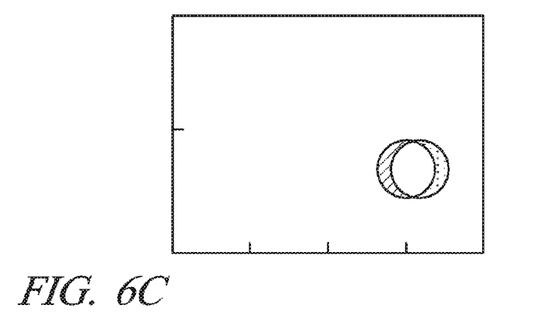

FIGS. 6A, 6B, and 6C illustrate an exemplary determination of an image difference by calculating an absolute image intensity difference in accordance with the disclosure. FIG. 6A depicts an original image. FIG. 6B depicts a second image with changes from the original image. In particular the depicted circular shape has shifted to the left. A comparison of the two images as illustrated in FIG. 6C, an output representing the result of an absolute image intensity difference comparison, identifies one region having gotten darker from the first image to the second image and another region having gotten lighter from the first image to the second image. Analysis of the comparison yields information that some change as a result of movement or change of perspective is likely available in that region of the images. In this way, absolute image intensity difference can be used to analyze a pair of sequential images to identify a potentially not clear path.

Likewise, determining an image difference by calculating a vehicle-motion compensated image difference can be used to gather information between two images. Many methods to calculate a vehicle-motion compensated image difference are known. One exemplary method of vehicle-motion compensated image difference includes analyzing a potential object as both a stationary portion of a clear path and a detected object at the same time. Likelihood analysis is performed on features identified corresponding to the potential object from both classifications at the same time, and the classifications may be compared, for example, through the following logic:

$$\text{Confidence}(i) = \text{ClearPathLikelihood}(i) - \text{DetectedObjectLikelihood}(i) \text{ If\_Confidence} > 0, \text{ then\_patch=clearpath} \quad (3)$$

In this exemplary comparison, if confidence(i) is greater than zero, then the patch containing the feature is classified as a clear path. If confidence(i) equals or is less than zero, then the patch containing the feature is classified as not a clear path or limited. However, different values may be selected for the confidence level to classify the patch as a clear path. For example, testing may show that false positives are more likely than false negatives, so some factor or offset can be introduced.

Figure 7:
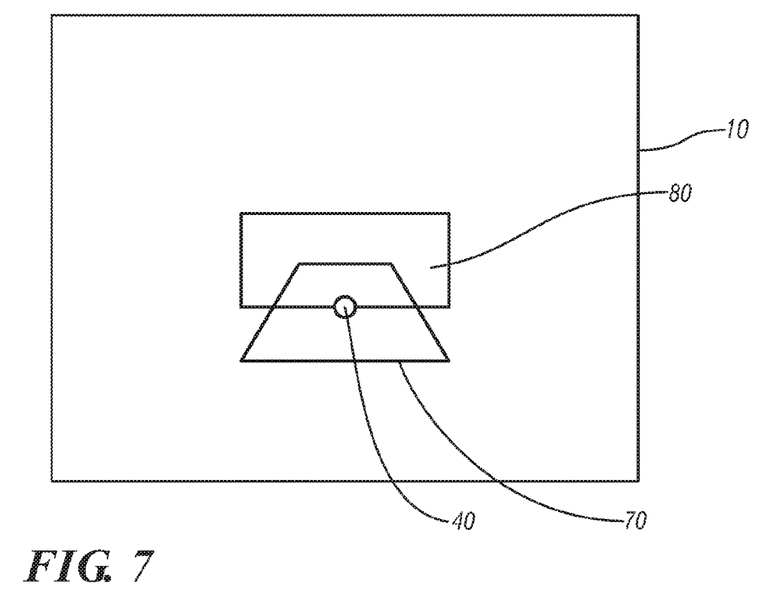
FIG. 7 illustrates an exemplary method to classify a feature as a portion of a clear path and as a detected object at the same time as a method of image analysis in accordance with the disclosure.
Figure 8:
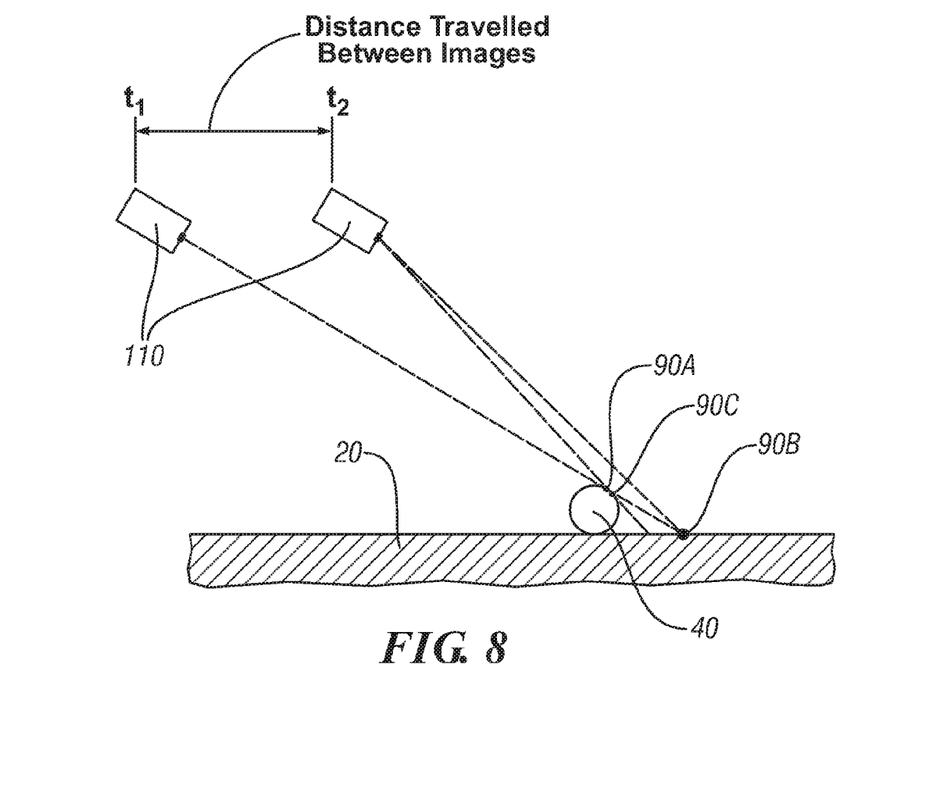
FIG. 8 further illustrates an exemplary method to classify a feature as a portion of a clear path and as a detected object at the same time as a method of image analysis in accordance with the disclosure.

FIG. 7 illustrates one method to classify a feature as a portion of a clear path and as a detected object at the same time as described above in accordance with the disclosure. Image 10 includes object 40, trapezoidal projection 70, and rectangular projection 80. This method utilizes an assumption projecting object 40 as a flat object on the ground within projection 70 to test the classification of the feature as a portion of a clear path. The method also utilized an assumption projecting object 40 as a vertical object within rectangular projection 80 to test the classification of the feature as a detected object. FIG. 8 illustrates comparisons made in data collected between the two images to evaluate the nature of object 40 in accordance with the disclosure. Camera 110 at time $t_1$ observes and captures data from object 40 in the form of a first image. If object 40 is an actual detected object, the profile observed by camera 110 of object 40 at time $t_1$ will correspond to point 90A. If object 40 is a flat object in the same plane as ground 20, then the profile observed by camera 110 of object 40 at time $t_1$ will correspond to point 90B. Between times $t_1$ and $t_2$, camera 110 travels some distance. A second image is captured at time t2, and information regarding object 40 can be tested by applying an algorithm looking at visible attributes of the object in the second image in comparison to the first image. If object 40 is an actual detected object, extending upward from ground 20, then the profile of object 40 at time $t_2$ will be observed at point 90C. If object 40 is a flat object in the same plane as ground 20, then the profile of object 40 at time t2 will be observed at point 90B. The comparison derived through vehicle-motion compensated image difference can directly assign a confidence by application of classifiers based on the observations of points 90, or the comparison may simply point to the area displaying change as a point of interest. Testing of the object against both classifications, as a flat object and as an actual detected object, allows either the area including object 40 to be identified for further analysis through analysis of a patch as described above or direct development of a clear path likelihood and a detected object likelihood for comparison, for example as in logic expression (2) above.

Information available from analysis of the second image can additionally be improved by integration of information regarding movement of the vehicle, such as speed and yaw-rate. Information regarding vehicle motion is available from a number of sources, including the vehicle speedometer, anti-lock braking mechanisms, and GPS location systems. Algorithms may utilize this vehicle movement information, for example, in conjunction with the projections described in FIGS. 7 and 8 to project angles which should exist in a feature laying flat on the ground in the second image based upon data from the first image and the measured movement of the vehicle between the images.

The number of images utilized for comparison need not be limited to two. Multiple image analysis can be performed at multiple iterations, with an object being tracked and compared over a number of cycles. As mentioned above, computational efficiency can be gained by utilizing image difference analysis to identify points of interest and eliminating areas with zero difference from subsequent analyses. Such efficiencies can be used in multiple iterations, for example, saying that only points of interest identified between a first and second image will be analyzed in the third and fourth images taken. At some point, a fresh set of images will need to be compared to ensure that none of the areas showing zero difference have had any change, for example a moving object impinging upon a previously clear path. The utilization of image difference analyses and of focused analyses, eliminating areas identified with zero change, will vary from application to application and may vary between different operating conditions, such as vehicle speed or perceived operating environment. The particular utilization of image difference analyses and of focused analyses can take many different embodiments, and the disclosure is not intended to be limited to the specific embodiments described herein.

Figure 9:
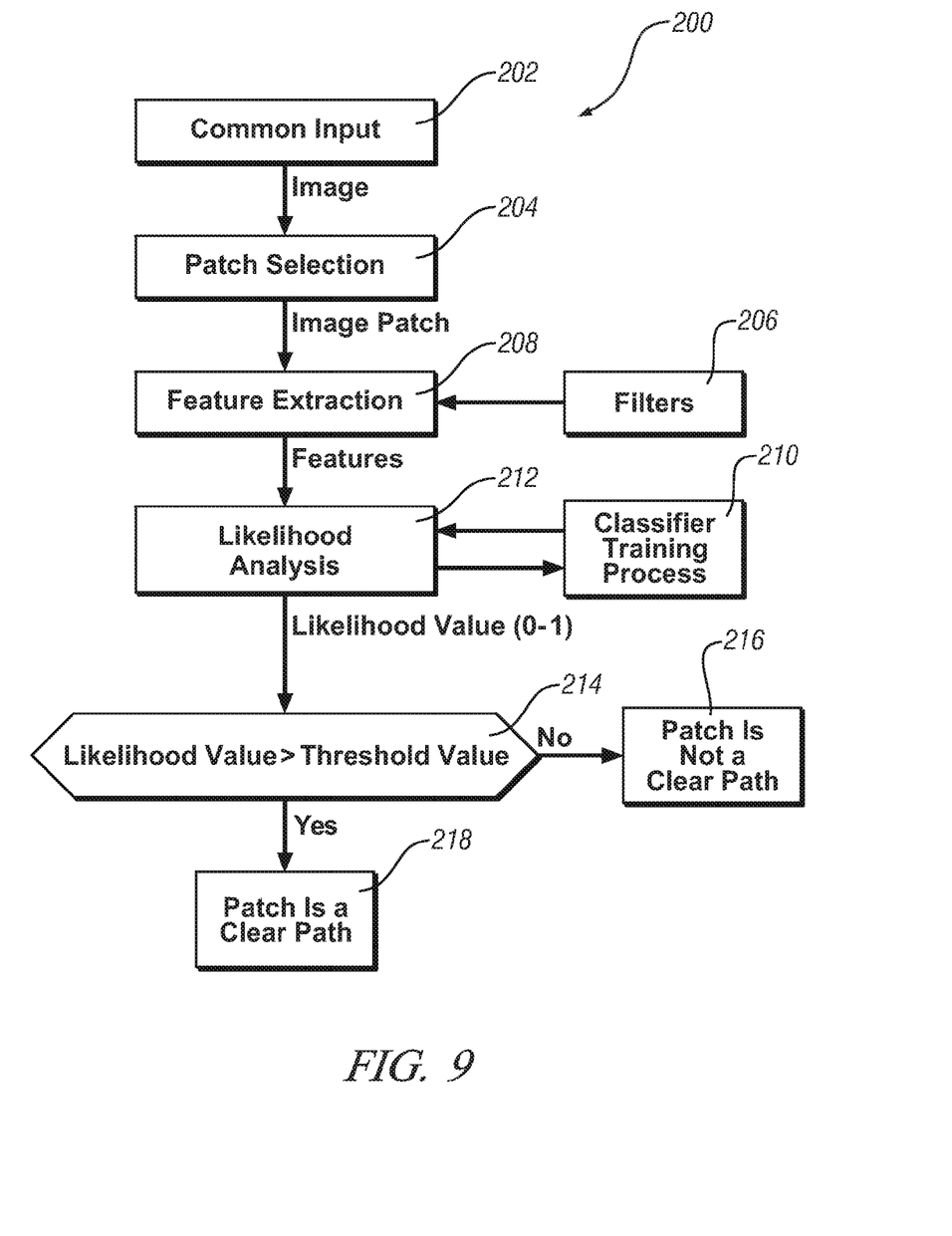
FIG. 9 illustrates an exemplary process to analyze an image through likelihood analysis in accordance with the disclosure.

FIG. 9 illustrates an exemplary process 200 wherein input from a camera is analyzed to determine a clear path likelihood in accordance with the disclosure. Camera input in the form of an image is generated at step 202. At step 204, a patch it selected for analysis from the image. Step 206 represents a filter or set of filters available to process the patch. At step 208, feature extraction is performed upon the selected patch through application of filters available from step 206 and application of other algorithms. Step 210 includes a classifier training process. As mentioned above, classifiers or logic used in developing likelihood values are initially trained offline. Training may optionally be continued in the vehicle based upon fuzzy logic, neural networks, or other learning mechanisms known in the art. These trained classifiers are utilized in step 212 to perform a likelihood analysis upon the features extracted in step 208, and a likelihood value for the patch is developed. This likelihood value expresses a confidence that the selected patch is clear. At step 214, the likelihood value developed in step 212 is compared to a threshold likelihood value. If the likelihood value is greater than the threshold value, then at step 218 the patch is identified as a clear path. If the likelihood value is not greater than the threshold value, then the patch is identified as a not clear path. As described above, process 200 may be repeated or reiterated in a number of ways, with the same image being analyzed repeatedly with the selection and analysis of different patches, and an identified patch can be tracked and analyzed for change over a number of sequential images.

As mentioned above, control module 120 may include algorithms and mechanisms to actuate autonomous driving control by means known in the art and not described herein, or control module 120 may simply provide information to a separate autonomous driving system. Reactions to perceived objects can vary, and include but are not limited to steering changes, throttle changes, braking responses, and warning and relinquishing control of the vehicle to the operator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for vehicle clear path detection using a camera comprising:
   imaging a ground area in front of said vehicle with said camera to produce a ground image; and
   analyzing said ground image by grouping all individual objects upon ground together as part of an overall uniform limitation and subtracting the overall uniform limitation from said ground image to formulate a clear path free of objects limiting travel of said vehicle including
      iteratively identifying a component patch of said ground image, each iteration corresponding to a different component patch identified,
      extracting, during each iteration, a feature from respective ones of said component patches, and
      classifying each of said component patches based upon respective ones of said features, said classifying comprising
         determining, during each iteration for each of said component patches, a respective patch clear path likelihood describing a fractional confidence that said respective feature is indicative of a clear path free of all objects limiting travel of said vehicle, wherein each respective patch clear path likelihood is determined by
            analyzing raw features a-priori during a training stage using a training set of images to obtain distinguishing features, and
            assigning the respective clear path likelihood of said respective feature based on the distinguishing features obtained during the training stage,
         comparing, during each iteration for each of said component patches, said respective patch clear path likelihood to a threshold clear path confidence, said threshold clear path confidence is a predetermined value constant for all determined patch clear path likelihoods,
         designating respective ones of said component patches as clear if respective ones of said patch clear path likelihoods are greater than said threshold clear path confidence, and
         designating respective ones of said component patches as not clear if respective ones of said patch clear path likelihoods are not greater than said threshold clear path confidence, wherein each component patch designated as not clear comprises part of the overall uniform limitation subtracted from said ground image to formulate said clear path.

2. The method of claim 1, wherein extracting a feature comprises feature recognition based on filtering said component patch.

3. The method of claim 1, wherein said threshold clear path confidence is substantially 0.5.

4. The method of claim 1, wherein identifying said component patch comprises identifying potential objects with a radar imaging system.

5. The method of claim 1, wherein identifying said component patch comprises:
   imaging a second ground area in front of said vehicle to produce a second ground image;
   comparing said second ground image to said ground image; and
   defining a component patch based on said comparison.

6. The method of claim 5, wherein comparing said second ground image to said ground image comprises:
   referencing said second ground image to said ground image;
   generating an image difference by absolute image intensity difference; and
   focusing upon an area of said image difference displaying a change in image intensity.

7. The method of claim 5, wherein comparing said second ground image to said ground image comprises:
   referencing said second ground image to said ground image;
   generating an image difference comprising a vehicle motion compensated image difference; and
   focusing upon an area of said image difference displaying a change in perspective characteristics.

8. A method for vehicle clear path detection using a camera comprising:
   imaging a first ground area in front of the vehicle with the camera to produce a first ground image;
   imaging a second ground area in front of the vehicle with the camera to produce a second ground image; and
   analyzing said first and second ground images by grouping all individual objects upon ground together as part of an overall uniform limitation and subtracting the overall uniform limitation from said first and second ground images to formulate a clear path free of objects limiting travel of said vehicle including
      iteratively identifying a component patch of said first ground image corresponding to an identified potential object, each iteration corresponding to a different component patch identified,
      comparing said second ground image to said first ground image through vehicle motion compensated image differences,
      generating, during each iteration for each of said component patches, a clear path likelihood describing a fractional confidence that said respective feature is indicative of a clear path free of all objects limiting travel of said vehicle and a detected object likelihood based on said comparison, wherein each respective patch clear path likelihood is determined by
         analyzing raw features a-priori during a training stage using a training set of images to obtain distinguishing features, and
         assigning the respective clear path likelihood of said respective feature based on the distinguishing features obtained during the training stage,
      classifying respective ones of said patches as clear if said clear path likelihood is greater than said detected object likelihood, and
      classifying respective ones of said patches as not clear if said clear path likelihood is not greater than said detected object likelihood, wherein each component patch classified as not clear comprises part of the overall uniform limitation subtracted from said first and second ground images.

9. An apparatus for vehicle clear path detection comprising:
a camera configured to generate a pixelated image; and
a control module analyzing said pixelated image by grouping all individual objects upon ground together as part of an overall uniform limitation and subtracting the overall uniform limitation from said pixelated image and generating a clear path output by
iteratively identifying a component patch of said pixelated image, each iteration corresponding to a different component patch identified,
extracting, during each iteration, a feature from respective ones of said patches, and
classifying each of said patches based upon respective ones of said features, said classifying comprising
determining, during each iteration for each of said component patches, a respective patch clear path likelihood describing a fractional confidence that said respective feature indicative of a clear path free of all objects limiting travel of said vehicle, wherein each respective patch clear path likelihood is determined by
analyzing raw features a-priori during a training stage using a training set of images to obtain distinguishing features, and
assigning the respective clear path likelihood of said respective feature based on the distinguishing features obtained during the training stage,
comparing, during each iteration for each of said component patches, said respective patch clear path likelihood to a threshold clear path confidence, said threshold clear path confidence comprising a predetermined value constant for all determined patch clear path likelihoods,
designating respective ones of said component patches as clear if respective ones of said patch clear path likelihoods are greater than said threshold clear path confidence, and
designating respective ones of said component patches as not clear if respective ones of said patch clear path likelihoods are not greater than said threshold clear path confidence, wherein each component patch designated as not clear comprises part of the overall uniform limitation subtracted from said ground image to formulate said clear path.

10. The apparatus of claim 9, further comprising:
a radar imaging device generating data corresponding to an object in front of said vehicle; and
wherein said control module identifies said component patch on the basis of said data.

11. The apparatus of claim 9, wherein said control module extracts said feature from said patch by applying feature recognition based on filtering said patch.

12. The apparatus of claim 9, further comprising:
said camera configured to generate a second pixelated image; and
wherein said control module
compares said pixelated image to said second pixelated image by applying an absolute image intensity difference comparison,
identifies within said comparison a potential object as any area displaying change, and
utilizes said potential object to identify said component patch.

13. The apparatus of claim 9, further comprising: equivalent said camera configured to generate a second pixelated image; and
wherein said control module
compares said pixelated image to said second pixelated image by applying a vehicle motion compensated image comparison,
identifies within said comparison a potential object as any area displaying change, and
utilizes said potential object to identify said component patch.

* * * * *